3,080,373
DIALLYL-NORTOXIFERINE DIHALIDES

Arthur Boller, Basel, Hans Els, Binningen, and Andor Furst, Basel, Switzerland, assignors to Hoffmann-La Roche Inc., Nutley, N.J., a corporation of New Jersey
No Drawing. Filed May 3, 1961, Ser. No. 107,333
Claims priority, application France Aug. 29, 1960
2 Claims. (Cl. 260—294.7)

The present invention involves the discovery of a small group of novel compounds which have properties making them valuable medicinal agents. More specifically, the invention concerns carbazole compounds, the nucleus of which is of the same structure as that of toxiferine. The novel compounds of the invention are diallyl-nortoxiferine dihalides.

The novel compounds of the invention are of the formula

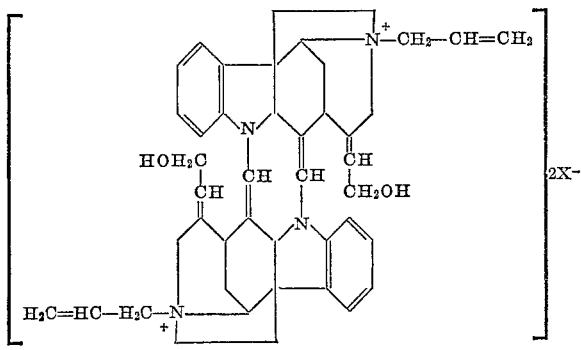

wherein X is a halogen.

The term halogen includes all 4 halogens, i.e. fluorine, chlorine, bromine and iodine, however chlorine and iodine are preferred embodiments of the invention. Thus, the invention embodies diallyl-nortoxiferine dihalides, with the preferred compounds being diallyl-nortoxiferine diiodide and diallyl-nortoxiferine dichloride.

The compounds of this invention can be prepared by two alternate general methods. The first consists of quaternizing the tertiary $N_{(b)}$-atom of Wieland-Gumlich aldehyde

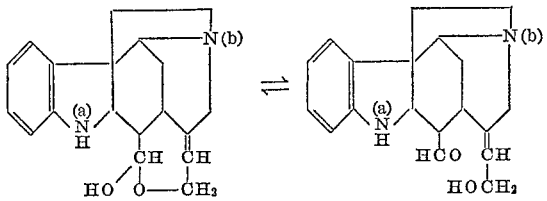

with an allyl halide. The obtained quaternary $N_{(b)}$-allyl-Wieland-Gumlich aldehyde halide [$N_{(b)}$-allyl-heminortoxiferine halide] is then dimerized to yield a diallyl-nortoxiferine dihalide. The second and alternate route is to first dimerize the Wieland-Gumlich aldehyde and then quaternize the obtained dimer (nortoxiferine) with two moles of allyl halide.

Wieland-Gumlich aldehyde is a known degradation product of strychnine [Liebigs Ann. Chem. 506 (1933), 60; J. Chem. Soc. 1955, 2258; J. Chem. Soc. 1961, 512].

In a preferred embodiment of the invention, the Wieland-Gumlich aldehyde is first quaternized with allyl iodide. The employment of the iodide is advantageous because the ultimately obtained diallyl-nortoxiferine diiodide is practically insoluble in the reaction medium of the dimerization step thereby permitting easy separation from the soluble by-products of said reaction and the attainment of the desired product in substantially pure form.

The quaternization of Wieland-Gumlich aldehyde with an allyl halide can be conducted in conventional inert solvents, for example organic solvents such as chloroform, methanol, and the like. The addition of the allyl halide to the solution containing the Wieland-Gumlich aldehyde can be conducted at room temperature or elevated temperatures. The dimerization of the obtained $N_{(b)}$-allyl-Wieland-Gumlich aldehyde halide is advantageously effected in the presence of an acid, preferably an organic acid, such as acetic acid, formic acid, isobutyric acid, cyclohexane carboxylic acid and the like. The acid selected as the condensing (dimerizing) agent can serve also as the solvent. In one preferred embodiment, when the halide being condensed is the iodide, the acidic condensing agent is sodium acetate in glacial acetic acid. In another preferred embodiment, when the halide being condensed is the chloride the acidic condensing agent is isobutyric acid. Further, it has been found preferable to effect the condensation with minimization or exclusion of oxygen and light. The preferred reaction temperatures are 80–100° C.

The anions of the diallyl-nortoxiferine dihalides can be exchanged for other anions by use of ion exchange resins, or if it is desired to replace some other halide by the chloride ion, by way of silver chloride.

The diallyl-toxiferine dihalides of this invention are valuable medicinal agents and have utility as muscle relaxants. They are especially valuable by virtue of their short duration of action. Furthermore they are easily antagonized by the usual chloinesterase inhibitors. The short acting diallyl-nortoxiferine dihalides of this invention are thus particularly valuable in those situations where a short acting muscle relaxant is desired.

The diallyl-nortoxiferine dihalides of this invention can be administered in conventional pharmaceutical forms (with dosage adjusted to individual requirements) known to those skilled in the art, for example they can be administered internally in application forms such as suspensions, parenteral solutions, and the like.

The following examples are illustrative but not limitative of the invention. All temperatures are in degrees centigrade.

Example 1

62 g. of Wieland-Gumlich aldehyde are dissolved under reflux in 2 liters of chloroform, the solution filtered, and cooled to below 30°. While the solution is then stirred 36 g. of allyl iodide and 200 ml. of chloroform are added in one portion. There are obtained 90.5 g. of $N_{(b)}$-allyl-Wieland-Gumlich aldehyde iodide, M.P. from 190° (slowly becoming brown), $[\alpha]_D^{22} = -43.3°$ (c.=1.003 in 1 N hydrochloric acid); $\lambda_{1\ max.} = 299$ m$\mu$, $\epsilon = 3,030$, $\lambda_{min.} = 267$ m$\mu$, $\lambda_{2max.} = 242$ m$\mu$ (in methanol). Orange-yellow color reaction with cerium (IV) sulfate.

Example 2

15 g. of the $N_{(b)}$-allyl-Wieland-Gumlich aldehyde iodide which had been dried at 50° in a high vacuum are heated to 90° in a stream of nitrogen for 5 hours while stirring with 360 ml. of deaerated acetic acid and 11.1 g. of water-free sodium acetate. In the course of the first hour, a solid which is initially present goes almost completely into solution and a yellowish-colored heavy precipitate soon separates. After the five hours are over and the reaction has been terminated the mixture is cooled to 20°, maintaining nitrogen atmosphere, the solution is then filtered under suction and the precipitate washed once with 20 ml. of acetic acid and three times with 50 ml. of ether and then dried over potassium hydroxide in a vacuum while excluding light and air. There are thus obtained 13.8 g. of diallyl-nortoxiferine diiodide; $\lambda_{max.} = 291$ m$\mu$, $\epsilon = 39,900$, $\lambda_{shoulder}$ at 320 m$\mu$, $\lambda_{min.} = 236$ m$\mu$ (broad) (in methanol). Violet color reaction with cerium (IV)-sulfate, quickly becoming pale.

Example 3

31 g. of diallyl-nortoxiferine diiodide are suspended in 1 liter of water and shaken with 1100 ml. of Amberlite IRA-400 (chloride ion form, described Merck Index, 7th edition, Merck & Co., Inc., Rahway, New Jersey (1960), page 1584), for 2 hours. The diiodide thereby goes into solution. The ion exchanger is filtered off and then washed in 3 portions with a total of 1 liter of water. The combined filtrates are then allowed to run through a column of 300 ml. of Amberlite IRA-400 (chloride ion form), rinsed with 300 ml. of water and the eluate evaporated to dryness in a vacuum while excluding air. The residue gives on recrystallization from methanol/ethanol crystalline pure colorless diallyl-nortoxiferine dichoride in a yield of 18.6 g. The compound contains 5 moles of water of crystallization after equilibration in air and shows the following characteristics: $[\alpha]_D^{22} = -348°$ (c.=1.0 in methanol); $\lambda_{max.} = 292$ m$\mu$, $\epsilon = 43,000$, $\lambda_{shoulder}$ at 317 m$\mu$, $\lambda_{min.}$ at 236 m$\mu$ (broad) (in methanol). The precipitation is uniform in the paper chromatogram (methyl ethyl ketone, saturated with water +1% methanol); violet color reaction with 1% cerium (IV)-sulfate in 2 N sulfuric acid becoming pale quickly (as toxiferine).

We claim:
1. Diallyl-nortoxiferine dihalide.
2. Diallyl-nortoxiferine diiodide.

References Cited in the file of this patent
UNITED STATES PATENTS 2,994,699    De Benneville    Aug. 1, 1961

OTHER REFERENCES

Bernauer et al.: Helvetica Chimica Acta., volume 41; pages 2296 and 2297 (1958).